United States Patent [19]

Balducci et al.

[11] Patent Number: 5,731,261
[45] Date of Patent: Mar. 24, 1998

[54] PROCESS FOR THE PREPARATION OF MIXED POROUS SILICA-ALUMINA OXIDES IN A SPHERICAL FORM

[75] Inventors: Luigi Balducci, Mortara; Raffaele Ungarelli, Trecate; Paolo Chiurlo, Milan, all of Italy

[73] Assignee: Enichem S.p.A., Milan, Italy

[21] Appl. No.: 642,897

[22] Filed: May 6, 1996

[30] Foreign Application Priority Data

Jun. 1, 1995 [IT] Italy ................... 00113995/A

[51] Int. Cl.$^6$ .......... B01J 32/00; C04B 35/185; C01B 33/00
[52] U.S. Cl. .......... 502/439; 502/8; 501/128; 423/328.1; 423/330.1
[58] Field of Search .......... 423/327.1, 328.1, 423/330.1, 388; 502/8, 439; 501/128

[56] References Cited

U.S. PATENT DOCUMENTS

| | | | |
|---|---|---|---|
| 3,890,247 | 6/1975 | Bietz et al. | 252/458 |
| 4,042,769 | 8/1977 | Lynch | 526/106 |
| 4,053,435 | 10/1977 | Lynch | 252/451 |
| 4,104,363 | 8/1978 | Vozka et al. | 423/338 |
| 4,169,926 | 10/1979 | McDonald | 526/106 |
| 4,226,743 | 10/1980 | Seese et al. | 252/453 |
| 4,469,648 | 9/1984 | Ferraris et al. | 264/9 |
| 4,574,003 | 3/1986 | Gerk | 51/309 |
| 5,076,980 | 12/1991 | Nogues et al. | 264/65 |
| 5,135,641 | 8/1992 | Pecoraro | 208/120 |
| 5,139,980 | 8/1992 | Nakahara et al. | 502/8 |
| 5,270,027 | 12/1993 | Balducci et al. | 423/338 |
| 5,304,364 | 4/1994 | Costa et al. | 423/338 |
| 5,336,477 | 8/1994 | Koga et al. | 423/328.1 |
| 5,380,687 | 1/1995 | Mangold et al. | 501/128 |
| 5,391,364 | 2/1995 | Cogliati | 423/335 |
| 5,424,258 | 6/1995 | Mangold et al. | 501/128 |

FOREIGN PATENT DOCUMENTS

| | | |
|---|---|---|
| 0 045 855 A1 | 2/1982 | European Pat. Off. . |
| 0 149 816 A1 | 7/1985 | European Pat. Off. . |
| 0 328 715 A1 | 8/1989 | European Pat. Off. . |
| 0 454 239 A2 | 10/1991 | European Pat. Off. . |
| 0 537 850 A1 | 4/1993 | European Pat. Off. . |
| 0 537 851 A1 | 4/1993 | European Pat. Off. . |
| 4831839 | 10/1973 | Japan ................... 423/338 |
| 57-175724 | 10/1982 | Japan ................... 423/328.1 |
| 2264940 | 9/1993 | United Kingdom . |
| 9323438 | 11/1993 | WIPO . |

OTHER PUBLICATIONS

Pierre et al. "Gelation of Aluminum Hydroxide Sols" Journal of the American Ceramic Society vol. 70 No. 1 (Jan. 1987) pp. 28–32.

Yoldas "Alumina Sol Preparation from Alkoxides" Ceramic Bulletin vol. 54 No. 3 (No Month, 1975) pp. 289–290.

*Primary Examiner*—Gary P. Straub
*Assistant Examiner*—Timothy C. Vanoy
*Attorney, Agent, or Firm*—Oblon, Spivak, McClelland, Maier & Neustadt, P.C.

[57] ABSTRACT

The present invention relates to a process for the preparation of mixed porous oxides with a spherical morphology and the oxides themselves thus obtained.

This process consists in emulsifying, in an acid environment, a mixed sol with a dispersing medium, gelifying the microemulsion thus formed by contact with an alkaline solution and subjecting the gel obtained to thermal aging in the presence of the emulsifying liquid and gelation base of the sol or in a water medium, under controlled conditions of pH and temperature.

The above mixed oxides can be widely applied as carriers for catalysts or as precursors of ceramic materials.

9 Claims, 1 Drawing Sheet

PROCESS FOR THE PREPARATION OF MIXED POROUS SILICA-ALUMINA OXIDES IN A SPHERICAL FORM

BACKGROUND OF THE INVENTION

1. Field of the Invention

The present invention relates to a process for the preparation of mixed oxides consisting in emulsifying, in an acid environment, a mixed silica-alumina sol with a dispersing medium, gelifying the microemulsion thus formed by contact with an alkaline solution and subjecting the gel obtained to thermal aging in the presence of the emulsifying liquid and gelation base of the sol or in a water medium, under controlled conditions of pH and temperature.

A further object of the present invention relates to mixed oxides obtained with the above process, consisting of silica and alumina in the form of porous particles with a spherical morphology having an average diameter of between 5 and 100 μm and characterized by specific surface values of between 200 and 700 m$^2$/g, a specific pore volume of between 1 and 2 cm$^3$/g, an average pore diameter of between 50 and 200 Å and an aluminum content expressed as $Al_2O_3$, of up to 75% by weight included.

2. Description of the Background

Processes for the preparation of mixed oxides with a spherical morphology consisting of silica and one or more metal oxides such as, for example, $Al_2O_3$, $TiO_2$ and MgO are the object of numerous patents.

In most of these, the technique for obtaining spheruliform materials which is most frequently described consists in spray-drying a water dispersion of the components in a cohydrogel form which are prepared under operating conditions which differ from patent to patent.

This method more or less decisively influences the physico-chemical characteristics of the products, such as for example, the specific surface, the specific volume and average pore diameter.

In fact it is known that the removal of water from hydrogels or cohydrogels with the traditional drying techniques, among which spray-drying, causes a considerable decrease in the porosity and even the collapse of the porous structure of the materials, thus excluding the possibility of obtaining highly porous products.

In particular, U.S. Pat. No. 4,226,743 and U.S. Pat. No. 5135641 describe mixed oxides consisting of silica and alumina in a spherical form prepared by spray-drying water dispersions of cohydrogels, characterized by a specific pore volume, measured with the known $N_2$ adsorption/deadsorption techniques, normally lower than 1 cm$^3$/g.

Various technologial solutions have been proposed to preserve the porous structure of the materials; for example, in the process described in the patent WO 93/23438, the water from silica-alumina cohydrogels is partially removed with a soluble organic medium such as alcohols, ketones or esters.

The dispersion of the cogel in the organic medium thus prepared, is subsequently subjected to spray-drying obtaining mixed silica-alumina oxides in the form of spheruliform particles marked by a specific surface varying from 400 to 600 m$^2$/g and a specific pore volume greater than or equal to 2 cm$^3$/g.

In other processes, such as that described in GB 2,264,940, the spray-drying of the hydrogels is carried out under such conditions as to only partially remove the water contained therein; the residual water is subsequently extracted with organic liquids soluble in water such as, for example, alcohols, ethers or their mixtures.

With this process, powders are obtained with a spheruliform morphology and with a specific pore volume greater than 1 cm$^3$/g.

It is also known that the preparation of silicas or mixed oxides based on silica in the form of spherical particles can also be carried out with processes consisting in emulsifying a silica hydrosol or mixed hydrosol based on silica (dispersed phase) in an[1]immiscible medium (continuous phase) and consolidating (or gelling) the microdrops in the emulsified state with various methods; for example, in the patent U.S. Pat. No. 5,304,364 the consolidation of the microdrops of acid silica hydrosol is carried out by putting the emulsion in contact with a basic solution and, after the pH variation of the system, the microdrops consolidate to obtain hydrogels with a spherical morphology.

With hydrogels and cohydrogels prepared with these processes, there is still the problem of removing the water from their structures to conserve their porosimetric characteristics; this disadvantage can be over-come, apart from the classical gel-drying methods under hypercritical conditions (U.S. Pat. No. 4,042,769; U.S. Pat. No. 4,053,435; EP 0 149 816; U.S. Pat. No. 5,304,364), which are not economically advantageous on an industrial scale owing to the production of powders, with other techniques such as the use of organic liquids capable of forming azeotropes, the water then being removed by distillation (U.S. Pat. No. 3,890,249).

Other methods for consolidating the structure of silica gels maintaining their porosity generally consist in subjecting the gels to aging operations, i.e. to particular thermal treatment in the presence of suitable organic mediums which can consist of poly-functional alcohols such as glycols, polyethylene glycols and surface-active agents (U.S. Pat. No. 4,169,926), esters such as amylacetate (U.S. Pat. No. 4,104,363) or alkanol-amines (U.S. Pat. No. 5,270,027).

The processes for the preparation of spherical particles by the emulsification and gelation of sols and the aging treatment of gels in organic mediums known to the art and described above, are mainly applied to materials consisting of pure silica.

The extension of these processes to the preparation of multicomponent oxides based on silica is much less known in the art, as there are problems of controlling the morphological particle size and structural characteristics.

SUMMARY OF THE INVENTION

In the field of materials consisting of mixed silica-alumina oxides with a spherical morphology it has been found that it is possible to overcome these problems obtaining products with a homogeneous structure and controlled physicochemical properties within a wide range of values.

A first object of the present invention therefore relates to a process for the preparation of mixed oxides consisting in emulsifying, in an acid environment, a mixed silica-alumina sol with a dispersing medium, gelifying the microemulsion thus formed by contact with an alkaline solution and subjecting the gel obtained to thermal aging in the presence of the emulsifying liquid and gelation base of the sol or in a water medium, under controlled conditions of pH and temperature.

DETAILED DESCRIPTION OF THE INVENTION

Figure 1:
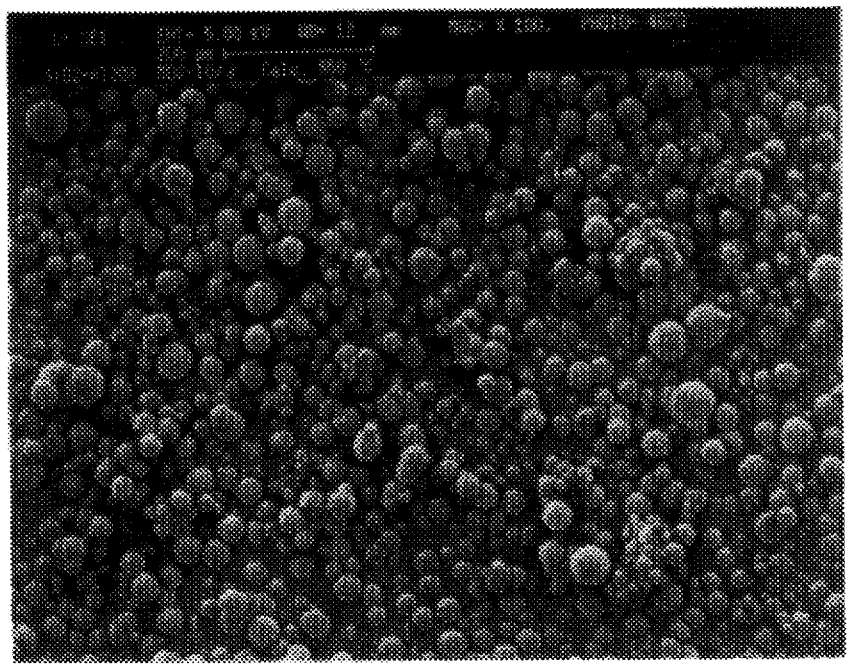
FIG. 1 is a microphotograph of a powder produced by the present invention taken with a scanning electron microscope.

In particular the process of the present invention comprises the following steps:

a) preparation of the mixed silica-alumina sol by the acid hydrolysis in a water medium of a silicon alkoxide in the presence of aluminum hydroxide in its colloidal state;

b) emulsification of the mixed sol thus obtained (dispersed phase) with an organic medium (continuous phase) consisting of at least one high alcohol with a number of carbon atoms greater than or equal to 8, to obtain a homogeneous emulsion;

c) gelation of the emulsion thus obtained by contact with a solution of an organic base in at least one of the above alcohols;

d) thermal aging of the gel thus formed in the presence of the above basic solution and at a temperature of between 50° and 150° C.;

the product thus obtained is finally subjected to finishing treatment such as separation from the emulsifying liquid, washing, drying and calcination at a temperature of >400° C. in an oxidizing atmosphere.

It has been surprisingly found that mixed silica-alumina sols, synthesized with this process, can provide products with perfectly controlled morphological-granulometrical and structural characteristics; a further object of the present invention therefore relates to mixed oxides, obtained with the above process, consisting of silica and alumina in the form of porous particles with a spherical morphology having an average diameter of between 5 and 100 μm and characterized by specific surface values of between 200 and 700 m$^2$/g, a specific pore volume of between 1 and 2 cm$^3$/g, an average pore diameter of between 50 and 200 Å and an aluminum content, expressed as $Al_2O_3$, of up to 75% by weight inclusive.

Finally, a preferred form of embodiment are powders consisting of mixed oxides with a spherical morphology having the formula $3Al_2O_3 \cdot 2SiO_2$, these powders also being used as precursors of ceramic materials with a mullitic structure.

The determinant passage to obtain mixed oxides with controlled morphological-granulometrical and structural characteristics relates to the preparation of the mixed sol which, in the process of the present invention, is carried out by the acid hydrolysis of silicon alkoxides in the presence of aluminum precursors in the form of hydroxides in the colloidal state (sol).

It has in fact been observed that mixed sols prepared with other techniques known in the art such as, for example, by the acid hydrolysis of silicon alkoxides in the presence of aluminum in the form of inorganic salt (nitrate, chloride or sulfate), do not allow, with the emulsification and gelation process of the sol of the invention, the production of mixed silica-alumina oxides in the form of spherical particles with a homogeneous internal structure and with sufficient mechanical resistance.

Aluminum precursors suitable for the purpose can be prepared with techniques known in literature, such as for example, that described by B. E. Yoldas (Ceramic Bulletin, Vol. 54, Nr.3 (1975), 289–290) comprising:

a) precipitation of the aluminum hydroxide from its alkoxides (isopropoxide, secondary butoxide) with a strong excess of $H_2O$ (molar ratio $H_2O$/alkoxide>or equal to 100);

b) peptization of the hydroxide thus formed in the presence of acids whose anions do not have complexing or strongly complexing properties of the $Al^{3+}$ ion, for example nitric, hydrochloric, perchoric, acetic, trichloroacetic or formic acid.

The peptization can be carried out, as indicated by Yoldas himself, using at least 0.03 moles of acid per mole of hydroxide and operating at temperatures>or equal to 80° C.; stable sols of aluminum oxide hydroxide can also be obtained however operating at room temperature according to the process described by A. C. Pierre and D. R. Uhlman [*J. am.Cer. Soc.* 70 (1), 28–32 (1987)].

Sols prepared by the peptization of aluminum oxide hydroxide known commercially as Catapal® or Disperal® have also proved to be useful for the purpose; these are aluminum oxide hydroxide with about 65% by weight of $Al_2O_3$ easily dispersible in $H_2O$ which, under suitable conditions of pH, generally indicated by the manufacturer, enable the production of stable colloidal dispersions.

For example, stable sols of aluminum oxide hydroxide containing up to about 100 g/l of $Al_2O_3$ can be obtained by dispersing at room temperature Disperal® Sol P3 (Condea) in a solution at 0.6% by weight of acetic acid.

The acid sols (pH<3.5) of aluminum oxide hydroxide used in the process of the present invention are preferably limpid or slightly opalescent and prove to consist of micelles whose average diameter, less than 500 nm, is between 100 and 200 nm.

The concentration of aluminum in the sol, expressed as $Al_2O_3$, is not critical; however sols with contents of $Al_2O_3$>20 g/l are preferably used which make the preparation of the mixed silica-alumina sol more convenient.

This is carried out by the hydrolysis of silicon alkoxides in the presence of the colloidal dispersion of aluminum oxide hydroxide synthesized under the conditions described above; tetramethoxyorthosilicate or, more preferably, tetraethoxyorthosilicate (TEOS) can be used as silicon alkoxide.

In the preferred operating embodiment the hydrolysis condition is carried out by adding TEOS to the sol of aluminum oxide hyroxide, maintained under mechanical stirring at a temperature of 20°–25° C. and a pH of between 1.5 and 2.5.

The possible correction of the pH within this range of values is usually carried out with the acid used in the preparation of the aluminum oxide hydroxide sol.

The reaction system, initially biphasic, becomes monophasic as the hydrolysis of the alkoxide proceeds; as the reaction is exothermic, the temperature is preferably maintained below 30° C. by external cooling of the reactor.

The hydrolysis times can vary from 15 to 60 minutes; this depends on the composition of the system (molar ratios Al/Si and $H_2O$ (Si+Al), on the pH and reaction temperature.

In the process of the present invention, the molar ratio Al/Si in the mixed sol can vary from 0.01 to 3, thus obtaining compositions of oxides containing up to 72% by weight of $Al_2O_3$ and corresponding to those of mullite ($3Al_2O_3 \cdot 2SiO_2$).

With molar ratios Al/Si>3.0, the morphological-granulometrical characteristics of the products undergo gradual deterioration as the aluminum content increases.

In mixed silica-alumina sols, the molar concentration (Si+Al) can vary from 0.5 to 2 moles/l; the quantity in moles of water used for the preparation of the mixed sol $(H_2O)_{total}$ is preferably such that the molar ratio $(H_2O)/(Si+Al)$ is between 20 and 50.

To obtain mixed oxides with a spherical morphology, it is fundamental to control the concentration of ethyl alcohol (EtOH) in the mixed sol, considering both the EtOH which comes from the hydrolysis reaction of TEOS [$Si(OC_2H_5)_4$] and that appropriately added to the sol, before this is mixed with the emulsifying medium (high alcohols with a number of carbon atoms>or equal to 8).

Operating with molar ratios EtOH/(H$_2$O), varying within the range of 0.2–0.5, problems are avoided involving the emulsionation of the sol in the high alcohols, obtaining particles with a perfectly spherical morphology and with controlled granulometric characteristics.

The mixed silica-alumina sol thus prepared, is initially premixed in the organic medium (continuous phase) consisting of monofunctional aliphatic alcohols or their mixtures, these alcohols being characterized by a number of carbon atoms greater than or equal to 8, a viscosity>or equal to 8 cps., a surface tension of about 30 dines/cm and a dielectric constant (>4) higher than those of the corresponding aliphatic hyrocarbons.

In the process of the present invention it is possible to use for example n-octanol, n-nonanol, n-decanol, n-undecanol, n-dodecanol or their isomers such as, for example, ethylhexyl alcohols; mixtures of these alcohols or industrial products consisting of mixtures of isomers can also be used and it is preferable to operate with n-decanol or homologous products such as ethylhexanol.

According to a known technique, the mixing of the silica sol with the organic medium can be carried out, for example, in mechanically stirred reactors; the stirrer and the stirring rate in this case must be such as to allow the formation of a homogeneous mixture between the dispersed phase (sol) and the continuous phase (emulsifying liquid).

The volumetric ratio (continuous phase)/(dispersed phase) can vary from 2 to 5 and preferably from 2.5 to 3.5; higher ratios do not significantly modify the characteristics of the products.

The pre-emulsion of the components formed under the above conditions is passed through a pipe with suitable geometrical characteristics (diameter, length); this operation can preferably be carried out by pressurizing the mixing reactor according to the known art described in U.S. Pat. No. 4,469,648.

The granulometrical characteristics of the products are influenced by the linear flow rate of the emulsion in the pipe.

Operating in pipes with an internal diameter varying from 1.8 to 5 mm and with a ratio length/diameter>or equal to 200, linear flow rates of between 0.3 and 3 m/sec allow products to be obtained with a particle size varying from 5 to 100 μm, the dimensions of the particles being inversely proportional to the linear flow rate.

At the outlet of the pipe the solution is put in contact with a basic solution to allow the consolidation (gelation) of the drops of silica-alumina sol.

This solution normally consists of the liquid used in the emulsification of the sol and an organic base soluble therein.

Cyclic amines such as, for example, cyclohexylamine or aliphatic amines with a number of carbon atoms <10 such as, for example, octadecylamine, or similar industrial products such as, for example, Primene® (Rohm and Haas) are preferable to aliphatic amines with a smaller number of carbon atoms or to those which are more hydrophilic such as, for example, alkanolamines, as they allow a better control of the gelation of the sol, providing a greater stabilizing effect of the spherical gel particles.

The volumetric ratio between the gelation solution and the emulsion can vary from 0.1 to 1, preferably from 0.25 to 0.5; the quantity of organic base present in the gelation solution is at least 10 times higher than that required for the stoichiometric neutralization of the acid present in the mixed silica-alumina sol, with the double purpose of enabling a rapid gelation of the drops of sol and at the same time, as already mentioned, avoiding the aggregation of the particles.

The gelation operation is carried out with the known technique by feeding the emulsion into the gelation solution under mechanical stirring in order to ensure an efficient exchange of the basifying solution, near the outlet of the emulsifying pipe.

The feeding of the emulsion is preferably carried out with the pipe not immersed in the gelation liquid to avoid obstructing the pipe itself.

The gelation operation is carried out at a temperature <or equal to 50° C.; the operation is normally carried out at the temperature of the emulsion.

At the end, the dispersion of microspheres of mixed silica-alumina gel is maintained under stirring for 30–60 minutes to ensure the complete gelation of the sol.

The microspheres of gel thus obtained have an average diameter varying from 5 to 100 μm depending on the emulsification conditions and, on analysis with a scanning electron microscope (SEM), they have a homogeneous internal structure; products obtained under analogous operating conditions starting from mixed silica-alumina sols synthesized with the known techniques (hydrolysis of silicon alkoxides in the presence of inorganic aluminum salts, such as nitrates, chlorides, etc) prove to consist of spherical particles with a non-homogeneous structure characterized by surface cracks and irregular cavities.

At the end of the gelation, the silica-alumina gel, in the form of spherical particles, is subjected to aging operations consisting in thermal treatment carried out either in the presence of the emulsifying liquid or the organic gelation base of the sol or in water phase under controlled conditions of pH and temperature.

Both aging processes allow the production of mixed porous oxides; it is preferable to follow the procedure using the emulsifying liquid and the organic base as it is technically simpler.

According to this method, the dispersion of the gel in the emulsifying liquid, in which the excess organic base used for the gelation of the sol is dissolved, is thermally treated at temperatures of between 30° and 110° C. and for times varying from 1 to 70 hours; it is preferable to operate at temperatures of between 70° and 95° C. and for times varying from 1 to 16 hours.

Shorter residence times of the product correspond to higher temperatures; for example, if the aging of the gel is carried out at 95° C., residence times of between 1 and 8 hours allow products to be obtained with a specific pore volume>or equal to 1.3 cm$^3$/g.

In the preferred embodiment, the mixed gel, at the outlet of the gelation reactor, is thickened, for example by sedimentation, to reach concentrations of solid (expressed as oxide) varying from 50 to 100 g/l; the thickened product thus obtained is subjected to thermal treatment in a closed container under calm conditions.

Although the chemical and physico-chemical nature of the mixed gel is somewhat different from that of pure silica, it has been surprisingly found that this treatment also has a reinforcing effect on the structure of the mixed gel, thus enabling the production of mixed porous silica-alumina oxides with the desired characteristics.

The reinforcing effect has also been surprisingly observed for mixed oxides with a high aluminum content (molar ratio Al/Si=3 corresponding to about 72% by weight of Al$_2$O$_3$).

In fact, without the aging treatment of the gels of the present invention, the specific volume and average diameter of the pores of the materials are generally lower than 0.5 cm$^3$/g and 50 Å respectively.

The reinforcing action of the gel structure can also be seen in the dimensions of the spherical particles which, without the aging treatment, undergo a considerable decrease when the gels, in the subsequent operations, are calcinated at a temperature of 550° C.

With the use of mixed sols, prepared according to the present invention, the spherical morphology and uniformity of the structure of the particles remain unaltered both during aging and in the subsequent drying and calcination operations.

On the contrary, the spherical morphology of the particles, obtained from sols prepared by the hydrolysis of silicon alkoxides in the presence of aluminum salts according to the known technique, undergoes progressive deterioration (tendency to crushing) in the aging treatment, depending on the composition of the gel (Si/Al ratio) and thermal treatment conditions.

In particular, the morphological alterations proved to be more evident the higher the content of Al and the aging temperature of the mixed gels.

An integrant part of the present invention therefore relates to the aging of gels in the presence of the emulsifying liquid and organic gelation base of the sol, and also aging in water phase under controlled conditions of pH and temperature.

It has been found, in fact, that the latter method, although technically less simple than the former, also allows porous particles of mixed oxides to be obtained with a specific pore volume of between 1 and 2 cm$^3$/g.

In the preferred operating embodiment the gel, separated by filtration from the gelation mother liquor, is redispersed in water under mechanical stirring; the water dispersion thus obtained (concentration of solids expressed as oxides varying from 50 to 100 g/l), after suitable correction of the pH within the range of values between 4 and 8, is subjected to thermal treatment at temperatures ranging from 70° to 110° C.; it is preferable to operate a temperatures varying from 80° to 95° C. and with residence times of the gel ranging from 2 to 8 hours.

Under these conditions mixed oxides are obtained with a spherical morphology characterized by a specific pore volume>or equal to 1 cm$^3$/g, a specific surface of between 200 and 500 m$^2$/g and an average pore diameter of between 70 and 150 Å.

At the end of the aging treatment carried out with the method described above, the product is separated, for example by filtration, and repeatedly washed with ethanol to remove most of the decanol and gelating base or water when the aging of the gel is carried out in water phase; the product is subsequently dried.

This operation is not critical; it can be carried out, for example, under vacuum at a temperature of 30°–40° C. or at atmospheric pressure.

The product is then calcinated at temperatures >400° C. in an oxidating atmosphere, for example in air; it is preferable to operate within a temperature range of between 500° and 550° C.

The calcination operation is carried out under controlled conditions: to favour a gradual decomposition of the organic residue (decanol, amine) adsorbed by the gel, the heating rate is maintained at <200° C./h and preferably between 50° and 100° C./h.

The residence times at this temperature can vary from a few hours to a maximum of 20 hours.

To evaluate the characteristics of the mixed oxides obtained with the process of the present invention, the products were calcinated at 550° C. for 10 hours with a heating rate of 50° C./h.

The mixed oxides of the invention are hereafter described in terms of specific pore volume (Vp), surface area (S.S.) and average pore diameter (dp).

The surface area was determined with the B.E.T. method (Brunauer, Emmet and Teller), the specific pore volume with the Dollimore-Heal method, both known the art.

The average pore diameter, expressed in Å, was calculated by the following known equation:

$$dp\ (Å)=[4\ Vp(cm^3/g)/S.S.(m^2/g)]\times 10^4$$

The average particle size was measured by a Malvern analyzer Series 2600C (Malvern Instruments, England) and expressed in terms of average diameter, $D_{(50)}$, corresponding to diameter with the ordinate at 50% in the particle size distribution curve in a cumulative form.

FIG. 1 shows a typical microphotography of the powders effected with a scanning electron microscope (SEM).

Figure 2:
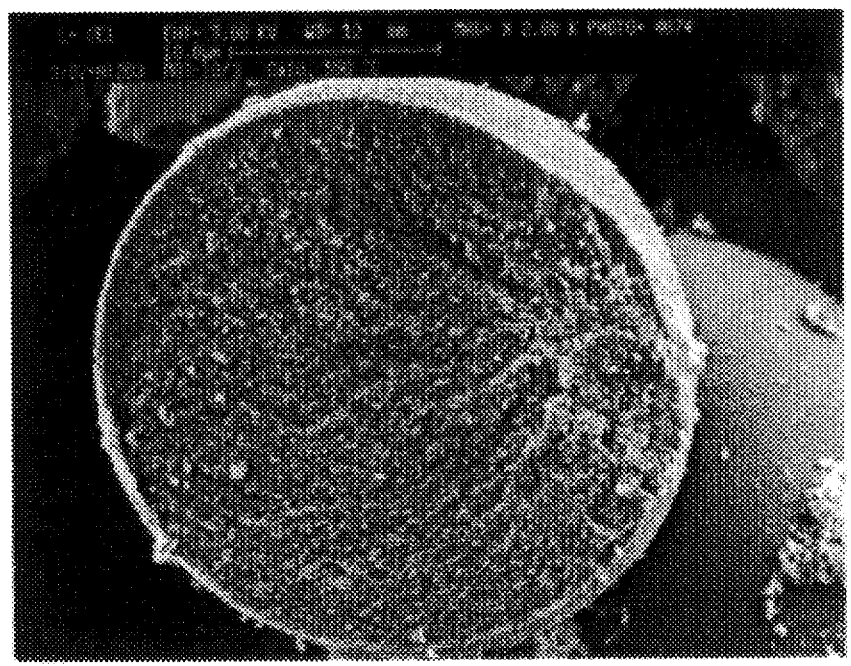
FIG. 2 shows the fracture surface of a particle.

FIG. 2 shows the homogeneity of the fracture surface of the particles.

The mixed silica-alumina oxides prepared with the process of the present invention, can be widely used as carriers of catalytic systems such as, for example, those suitable for the conversion of hydrocarbons and the polymerization of olefins.

In particular, in this latter application, the spherical form of the porous particles linked with a narrow diameter distribution, is suitable for the catalytic processes in gas phase.

In addition, these mixed oxides, and in particular those with the composition $3Al_2O_3 \cdot 2SiO_2$, can be used as precursors of ceramic materials such as, for example, those with a mullitic structure.

The following experimental examples are purely illustrative and do not limit the scope of the present invention.

EXAMPLE 1

A) Preparation of the Sol 271 ml of secondary aluminum butoxide [sec-Al(OC$_4$H$_9$)$_3$, Fluka, titer in Al$_2$O$_3$: 21%, density at 20° C.: 0.96 g/ml], equivalent to a mole of Al, are charged into a cylindrical, 4 litre, glass reactor, equipped with mechanical stirring, thermometer, water-cooled condenser and external heating/cooling bath.

1203 ml of demineralized H$_2$O are subsequently added and the mixture is heated under vigorous stirring to 84° C.; these conditions are maintained for 2 hours.

5.5 ml of concentrated HNO$_3$ [C. Erba Analyticals, titer: 70%, density at 20° C.: 1.413 g/ml] are then added and the mixture is maintained at a temperature of 84° C. under stirring for a further 2 hours, obtaining a colloidal solution of aluminum oxide hydroxide slightly opalescent which, after cooling to a temperature of 25° C., is diluted with 580 ml of demineralized H$_2$O; 6.7 ml of concentrated HNO$_3$ and 456 ml of tetraethoxyorthosilicate [Si(OC$_2$H$_5$)$_4$, Fluka, titer: greater than or equal to 98%, density at 20° C.: 0.933 g/ml], equivalent to two moles of Si (Si/Al=2.0) are then added.

The mixture is maintained under stirring for the time necessary to obtain a monophasic colloidal solution (about 15 minutes), regulating the temperature by means of the external cooling bath, so that the reaction temperature does not exceed 30° C.

The colloidal solution at pH 2.2÷2.3 is maintained under stirring for another hour at a temperature of about 25° C. and is subsequently stored at a temperature of 4° C. until the moment of use.

The total concentration of oxides in the sol, expressed as (SiO$_2$+Al$_2$O$_3$), is about 83 g/l.

B) Emulsification of the Sol

The operation is carried out in a 1 litre laboratory reactor equipped with: temperature regulation by means of thermo-cryostat, pressurization system with nitrogen, mechanical turbine stirring with 6 radial blades activated by a motovariator at a controlled rate, internal plunged pipe with an internal diameter of 5 mm and reagent charging-gate and vent.

The plunged pipe is connected, by means of a ball valve, to the emulsification pipe (internal diameter 3.1 mm and length 500 cm) and outlet of the emulsion in the 1 litre, cylindrical, glass reactor (internal diameter 100 mm), equipped with a turbine stirrer with 6 radial slanting blades and with a controlled rate.

150 ml of sol (100 ml prepared as described in A) diluted with 50 ml of EtOH at 99.5% and 450 ml of 1-decanol (Fluka) are charged into the reactor; the temperature is thermostat regulated at 20° C. maintaining the mixture under stirring (300 rpm) for 5 min.

The reactor is then pressurized at 2.8 bars with nitrogen and the pre-emulsion is discharged by means of the ball valve and through the emulsification pipe, into the gelation bath of the sol consisting of a solution of cyclohexylamine (15 ml) in 1-decanol (150 ml) maintained under stirring (300 rpm) at a temperature of 20° C.

500 ml of emulsion are discharged into the gelation reactor in 45 sec.; the linear flow rate of the emulsion in the pipe was equal to 1.47 m/sec.

The silica and alumina gel thus obtained is maintained under stirring for 1 hour; it is subsequently left to decant and the clear liquid is siphoned until a thickened solid is obtained at about 80 g/l expressed as $(SiO_2+Al_2O_3)$.

C) Aging of the Gel

The gel thickened in its mother liquor, as obtained in B), is transferred to a glass container equipped with a suitable hermetically closed tap and then immersed in a thermostat-regulated bath and heated to 95° C.; the heating is continued for 2 hours (final pH of the turbid mass at 20° C.=9.5).

After cooling, the product is filtered, washed with absolute ethyl alcohol, dried at reduced pressure (0.1 bars) and finally calcinated in the air at a temperature of 550° C. for 10 hours, the heating rate being regulated at 50° C./h.

The product, with a spherical morphology, proved, on granulometric analysis, to consist of particles with an average diameter $D_{(50)}$=35 µm and with 70% by weight of particles having a diameter of between 20 and 50 µm.

The mixed oxide, containing about 29% by weight of $Al_2O_3$, had the following characteristics: specific surface (S.S.)=484 $m^2/g$; specific pore volume (Vp)=1.47 $cm_3/g$; average pore diameter (dp)=121 Å.

EXAMPLES 2–12

Example 1 is repeated, varying the temperature (T) and the aging time (t) of the gel.

Table 1 shows the results relating to the determination of the specific surface (S.S.), specific volume (Vp) and average pore diameter (dp) of the products obtained, as always after calcination.

TABLE 1

| Example | Aging Conditions T(°) | t(h) | S.S. $m^2/g$ | Vp $cm^3/g$ | dp Å |
|---|---|---|---|---|---|
| 2 | 95 | 4 | 429 | 1.40 | 131 |
| 3 | 95 | 8 | 410 | 1.30 | 127 |
| 4 | 95 | 16 | 383 | 1.27 | 132 |
| 5 | 70 | 8 | 457 | 1.07 | 94 |
| 6 | 70 | 16 | 484 | 1.20 | 99 |
| 7 | 70 | 32 | 459 | 1.33 | 116 |
| 8 | 70 | 64 | 413 | 1.18 | 114 |
| 9 | 50 | 8 | 526 | 0.95 | 72 |
| 10 | 50 | 32 | 483 | 1.16 | 96 |
| 11 | 30 | 8 | 523 | 1.00 | 76 |
| 12 | 30 | 64 | 459 | 0.86 | 75 |

EXAMPLES 13–18

Example 1 is repeated, using mixed silica-alumina sols having molar ratios Al/Si varying from 0.05 to 3.

Table 2 shows the compositions of the sols (molar ratios Al/Si, $EtOH/[H_2O]_t$, $[H_2O]_t/[Si+Al]$) and the linear flow rate (V) of the emulsion in the discharge pipe (emulsification volumetric ratio sol/n-decanol=1:3).

The results relating to the properties of the materials refer to the products obtained from gels aged at 95° C. for 4 hours, dried and calcinated.

TABLE 2

| Ex. | Al/Si moles | EtOH/ $[H_2O]_t$ moles | $[H_2O]_t/$ [Si + Al] moles | V m/sec | $D_{(50)}$ µm | S.S. $m^2/g$ | Vp $cm^3/g$ | dp Å |
|---|---|---|---|---|---|---|---|---|
| 13 | 0.05 | 0.45 | 20 | 1.84 | 23 | 453 | 1.22 | 107 |
| 14 | 0.10 | 0.40 | 20 | 1.63 | 29 | 435 | 1.29 | 119 |
| 15 | 0.25 | 0.35 | 25 | 1.52 | 30 | 421 | 1.18 | 112 |
| 16 | 1.00 | 0.43 | 50 | 1.47 | 31 | 427 | 1.36 | 127 |
| 17 | 2.00 | 0.21 | 50 | 1.41 | 34 | 389 | 1.47 | 151 |
| 18 | 3.00 | 0.20 | 50 | 1.38 | 33 | 351 | 1.06 | 103 |

The results show that even operating within a wide range of compositions, products with a specific pore volume>1 $cm^3/g$ are obtained.

EXAMPLES 19–20

Compared to example 1 a mixed sol is used prepared from the oxide hyroxide of Al Disperal® Sol P3 of Condea.

77.6 g of Disperal® Sol P3, equivalent to 1 mole of Al, are added to 477 g of a water solution at 0.6% by weight of acetic acid, maintained under mechanical stirring.

After about 30 min. a slightly opalescent sol of Al oxide hydroxide is obtained to which 580 ml of demineralized $H_2O$, 12 ml of $HNO_3$ (at 70% by weight) and 456 ml of TEOS, equivalent to 2 moles of Si (ratio Si/Al=2) are subsequently added; the hydrolysis is carried out under the conditions described in example 1 and a mixed sol is obtained having a pH of about 2.5 and a silica and aluminum content, expressed as the sum of $SiO_2$ and $Al_2O_3$, equal to about 115 g/l The sol thus prepared is subsequently emulsified, gelated and aged according to the procedure described in example 1.

The results obtained, relating to two aging conditions, are shown in Table 3.

TABLE 3

| Example | Aging Conditions T(°C) | t(h) | S.S. m²/g | V.p cm³/g | dp Å |
|---|---|---|---|---|---|
| 19 | 95 | 2 | 487 | 1.58 | 129 |
| 20 | 70 | 32 | 480 | 1.61 | 134 |

EXAMPLES 21–22

Example 13 is repeated (molar composition Al/Si=0.05) varying the aging method of the gel.

At the end of the gelation, the product is separated from the mother liquor by filtration and is subsequently redispersed in demineralized water (about 100 g/l of solid expressed as oxides).

The pH of the dispersion is corrected to the preset value and the sample is then subjected to thermal treatment at a temperature of 95° C. for 4 hours.

The product is finally washed with EtOH, dried and calcinated at 550° C. according to the procedure of example 1.

The results obtained are shown in Table 4.

TABLE 4

| Example | Aging Conditions pH | S.S. m²/g | V.p cm³/g | dp Å |
|---|---|---|---|---|
| 21 | 8.0 | 415 | 1.02 | 99 |
| 22 | 4.5 | 418 | 1.00 | 96 |

EXAMPLES 23–24

Example 17 is repeated (molar composition Al/Si=2), following the aging method of the gels described in examples 21–22

The results obtained are shown in Table 5.

TABLE 5

| Example | Aging Conditions pH | S.S. m²/g | V.p cm³/g | dp Å |
|---|---|---|---|---|
| 23 | 8.0 | 461 | 1.27 | 111 |
| 24 | 4.5 | 415 | 1.20 | 115 |

The results relating to examples 21–24 show that with the aging method of the gels in water phase porous products with a specific pore volume>1 cm₃/g and with an average pore diameter of about 100 Å, can be obtained.

It can also be noted that these results can be obtained within a wide range of silica-alumina composition.

COMPARATIVE EXAMPLES

A series of examples are provided below which relate to products whose gels either have not undergone any aging treatment or were prepared from mixed silica-alumina sols which are different from those of the invention.

EXAMPLES 25–30

At the end of the gelation, the gels having molar compositions Al/Si varying from 0.05 to 3.0 (see examples 13–18 of Table 2) are separated from the basic decanol solution by filtration; after repeated washings with ethyl alcohol, they are subsequently dried and calcinated under the conditions of example 1.

The results obtained are shown in Table 6.

TABLE 6

| Ex. | Al/Si moles | $D_{(50)}$ μm | Vp cm³/g | dp Å |
|---|---|---|---|---|
| 25 | 0.05 | 19 | 0.24 | 24 |
| 26 | 0.10 | 22 | 0.35 | 27 |
| 27 | 0.25 | 24 | 0.21 | 28 |
| 28 | 1.00 | 25 | 0.40 | 47 |
| 29 | 2.00 | 28 | 0.70 | 76 |
| 30 | 3.00 | 29 | 0.51 | 67 |

On comparing the results shown in Table 2, it can be seen that the products not subjected to aging undergo a considerable decrease in porosity (Vp) and average pore diameter (dp).

Also the dimensions of the particles [$D_{(50)}$] are considerably reduced.

EXAMPLE 26

A sol is used, prepared by the hydrolysis of tetraethoxyorthosilicate (TEOS) in the presence of aluminum nitrate.

105.3 g of $Al(NO_3)_3 \cdot 9H_2O$ (titer 98%) equivalent to 0.275 moles of Al are dissolved in 1550 ml of $H_2O$; 1250 ml of TEOS, equivalent to 5.5 moles of Si (molar ratio Al/Si=0.05) are subsequently added.

The mixture is maintained under mechanical stirring regulating the temperature so that it does not exceed 30° C.; after about 30 min. a monophasic solution is obtained which is maintained under stirring for a further hour at a temperature of 25° C. (final pH 2.15).

100 ml of sol thus prepared are emulsified in 300 ml of 1-decanol following the operating procedure described in example 1.

The product recovered at the end of the gelation, after washing with EtOH and drying in the air, proved to consist of spherical particles with surface defects (presence of cracks) and with a dishomogeneous internal structure (presence of irregular cavities).

On the aging of the gel, carried out both in a basic decanol solution (comp. example 1) and in water phase (comp. examples 21–22), the morphological and granulometrical characteristics undergo considerable deterioration owing to the more or less marked crushing of the particles.

We claim:

1. Process for the preparation of mixed silica-alumina oxides, comprising the following steps:
   a) preparation of the mixed silica-alumina sol by the acid hydrolysis in a water medium of a silicon alkoxide in the presence of aluminum oxide hydroxide in its colloidal state;
   b) emulsification of the mixed sol thus obtained (dispersed phase) with an organic medium (continuous phase) consisting of at least one higher alcohol with a number of carbon atoms greater than or equal to 8, to obtain a homogeneous emulsion;
   c) gelation of the emulsion thus obtained by contact with a solution of an organic base in at least one of the above alcohols;

d) thermal aging of the gel thus formed carried out for at least one hour.

2. Process, according to claim 1, wherein the higher alcohol of step b) is selected from n-octanol, n-nonanol, n-decanol, n-undecanol, n-dodecanol and/or their isomers.

3. Process, according to claim 2, wherein the alcohol is n-decanol or its homologous product ethylhexanol.

4. Process, according to claim 1, wherein the organic base used in the gelation operation of the sol referred to in step c) consists of at least one aliphatic amine with a number of carbon atoms higher than or equal to 10 and/or at least one cyclic amine.

5. Process, according to claim 4, wherein the cyclic amine is cyclohexylamine.

6. Process, according to claim 1, wherein the thermal aging of the gel carried out in step d. is carried out in the presence of the basic solution resulting from steps b and c of claim 1 at a temperature between 50° and 150 ° C.

7. Process, according to claim 6, wherein the thermal aging carried out in the presence of the basic solution, is carried out at a temperature between 70° and 110° C.

8. Process, according to claim 1, wherein the thermal aging of the gel carried out in step d. is carried out by separating the gel from the mother liquor by filtration at the end of the gelation step c and dispersing the gel in water at a pH of between 4 and 8 and at a temperature between 70° and 110°.

9. Process, according to claim 8, wherein the thermal aging carried out in water phase, is carried out at a temperature between 80° and 95° C.

* * * * *